United States Patent
Porter et al.

(10) Patent No.: US 8,949,244 B2
(45) Date of Patent: Feb. 3, 2015

(54) USING CHRONOLOGY AS THE PRIMARY SYSTEM INTERFACE FOR FILES, THEIR RELATED META-DATA, AND THEIR RELATED FILES

(71) Applicant: Skychron, Inc., Kirkland, WA (US)

(72) Inventors: Sheridan L Porter, Kirkland, WA (US); Swain W. Porter, Kirkland, WA (US)

(73) Assignee: SkyChron Inc., Kirkland, WA (US)

( * ) Notice: Subject to any disclaimer, the term of this patent is extended or adjusted under 35 U.S.C. 154(b) by 0 days.

(21) Appl. No.: 13/901,980

(22) Filed: May 24, 2013

(65) Prior Publication Data

US 2013/0325859 A1    Dec. 5, 2013

Related U.S. Application Data

(60) Provisional application No. 61/653,332, filed on May 30, 2012.

(51) Int. Cl.
*G06F 17/00* (2006.01)
*G06F 17/30* (2006.01)
*G06Q 10/10* (2012.01)

(52) U.S. Cl.
CPC .... *G06F 17/30386* (2013.01); *G06F 17/30044* (2013.01); *G06Q 10/109* (2013.01)
USPC ........... 707/740; 707/610; 707/661; 707/736; 707/758; 706/12; 706/14; 706/45; 705/7.11

(58) Field of Classification Search
None
See application file for complete search history.

(56) References Cited

U.S. PATENT DOCUMENTS

| | | | |
|---|---|---|---|
| 7,181,701 B2 | 2/2007 | Howard et al. | |
| 8,452,855 B2* | 5/2013 | Higgins et al. | 709/219 |
| 8,468,143 B1* | 6/2013 | Oztekin et al. | 707/706 |
| 8,738,634 B1* | 5/2014 | Roth et al. | 707/748 |
| 2005/0108233 A1* | 5/2005 | Metsatahti et al. | 707/9 |
| 2005/0108234 A1* | 5/2005 | Oksanen et al. | 707/9 |
| 2005/0108253 A1* | 5/2005 | Metsatahti et al. | 707/100 |
| 2008/0033957 A1* | 2/2008 | Forstall et al. | 707/9 |
| 2008/0133697 A1* | 6/2008 | Stewart et al. | 709/217 |

(Continued)

FOREIGN PATENT DOCUMENTS

| | | |
|---|---|---|
| JP | 2002-288015 A | 10/2002 |
| JP | 2004-234383 A | 8/2004 |

(Continued)

OTHER PUBLICATIONS

International Search Report and Written Opinion for PCT/US2013/042909, mailed Sep. 5, 2013, 6 pages.

*Primary Examiner* — Hung Le
(74) *Attorney, Agent, or Firm* — Schwabe, Williamson & Wyatt PC

(57) ABSTRACT

Methods, Apparatuses, and Storage Medium associated with chronology based file management are disclosed herein. In embodiments, a method may include receiving a selection of a plurality of files or the plurality of files, and generating association data selectively associating the plurality of files with a plurality of events scheduled in a calendar of a user or time periods of the user. The method may further include storing the association data to facilitate subsequent selectively retrieval of the plurality of files in response to retrieval requests for files associated with selected ones of the plurality of events scheduled in the calendar of the user or the time periods of the user. Other embodiments may be described and claimed.

28 Claims, 4 Drawing Sheets

(56) References Cited

U.S. PATENT DOCUMENTS

| | | | |
|---|---|---|---|
| 2009/0249355 A1* | 10/2009 | Kaarela et al. | 719/313 |
| 2010/0026840 A1* | 2/2010 | Yu et al. | 348/231.2 |
| 2010/0306261 A1* | 12/2010 | Geisner et al. | 707/776 |
| 2011/0239146 A1* | 9/2011 | Dutta et al. | 715/768 |
| 2011/0276924 A1* | 11/2011 | Voonna et al. | 715/853 |
| 2011/0302227 A1* | 12/2011 | Jones, III | 707/827 |
| 2012/0102397 A1* | 4/2012 | Arms et al. | 715/273 |
| 2012/0203853 A1* | 8/2012 | Davis et al. | 709/206 |
| 2013/0212492 A1* | 8/2013 | Chen et al. | 715/753 |

FOREIGN PATENT DOCUMENTS

| | | |
|---|---|---|
| JP | 2011-070257 A | 4/2011 |
| JP | 2012-014395 A | 1/2012 |
| KR | 10-2004-0062887 A | 7/2004 |

\* cited by examiner

USING CHRONOLOGY AS THE PRIMARY SYSTEM INTERFACE FOR FILES, THEIR RELATED META-DATA, AND THEIR RELATED FILES

RELATED APPLICATIONS

This non-provisional application claims priority to U.S. Provisional Application, No. 61/653,332, having the same title, filed May 30, 2012.

BACKGROUND/INTRODUCTION

The background/introduction description provided herein is for the purpose of generally presenting the context of the disclosure. Unless otherwise indicated herein, the materials described in this section are not prior art to the claims in this application and are not admitted to be prior art by inclusion in this section.

The most important aspect of human memory is context. We remember events by time, place, person and category. The present disclosure (hereinafter, SkyCHRON) is a new scheduling related technology that integrates file tracking in a way that more closely mimics the human memory contextual model, allowing users to organize, share with appropriate privacy and find their files in a more intuitive way that is closer to how our brains actually work.

Ever since the advent of the personal computer, users have struggled to manage their files. Files have traditionally been organized into folder structures, which tend to quickly become obsolete with disuse, or require a high degree of maintenance to remain useful as a user's needs change over time. As our lives have become ever more connected, and users generate and share ever more files, the problem of keeping these files organized and retrievable over the long term becomes ever more complicated.

In addition to the drawbacks of maintaining folders as the primary organizing interface to a user's files, such folders typically lack context about the files they contain and the relationships between different files and events. More recently, the prevalence of search technologies have made it easier to locate individual files, but often at the expense of losing context around those files. Though files are time stamped, chronology is treated almost as an afterthought in today's computer systems. No system today has incorporated rich chronology and associated context deeply into the user's interface to their files.

Some rich context and chronology is captured in individual applications such as current calendar applications and journaling systems, but this information does not persist with individual files. Calendars are primarily used to keep appointments, not organize and relate files. More advanced calendars allow files to be stored within events, but still use the same old "file in folder" paradigm. Some calendar systems even allow sharing between users and categorization of events, but little of this context remains useful to the user long term. Diary and journaling applications also suffer from the same problems as calendars, in addition to being primarily backward facing in their design. None of these applications capture rich contextual information about files and relationships between files automatically, nor are they designed to preserve such information to be useful in long term storage and retrieval.

Cloud storage to date has created more backup options for users, but done little to improve the capture of contextual information about those files. Typical cloud storage systems are used as a "virtual hard drive" that promises not to lose the data, but does little that is new in organizing or retrieving it.

Recently, social networks have begun to generate a large amount of contextual information, but this information is not captured in a way that assists in organizing all of an individual's files. What information is captured, only applies to what has been shared on the social network site. Social networks are focused on providing context for external users, for shared information, not for individuals maintaining their own information privately.

SkyCHRON is the first system to make chronology the primary interface for organizing user files, creating and maintaining rich contextual information about those files in the process.

BRIEF DESCRIPTION OF DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
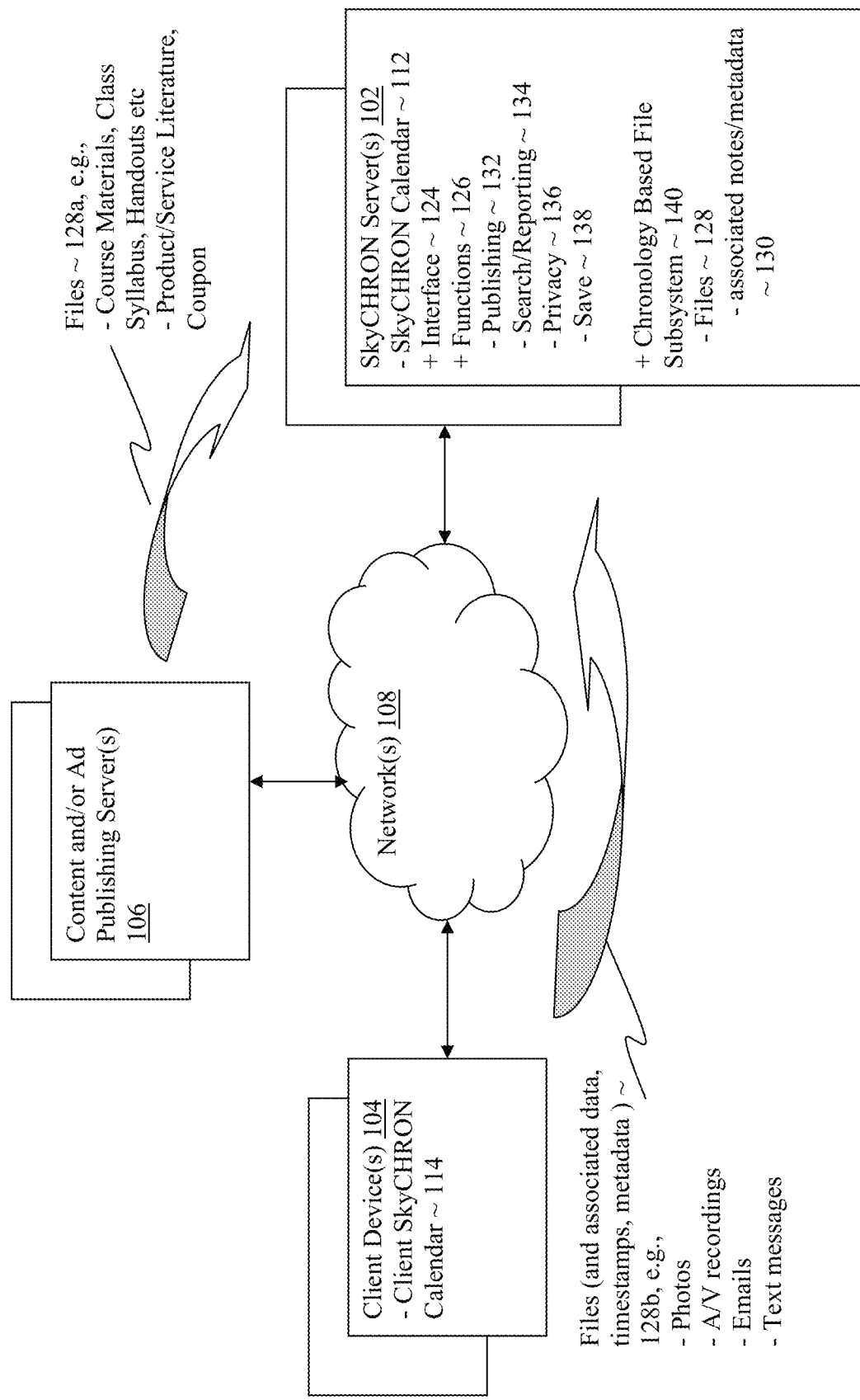
FIG. 1 illustrates an overview of a computing environment incorporated with the teachings of the present disclosure, in accordance with various embodiments.

Embodiments of the present disclosure are related to the methods, apparatuses and storage medium associated with using a Calendar as the gateway to file organization and retrieval, whereby the Calendar is primary interface between system and users, and related data, UI, advertising and payment paradigms. As illustrated in FIG. 1, SkyCHRON server 102 may be incorporated with SkyCHRON calendar 112 of the present disclosure, having deep functionality 126 built into the calendar interface 124, described more fully below. Users may access and use SkyCHRON Calendar 112, including the deep functions 126, through client devices 104. Client devices 104 may be provisioned with a client side 114 of SkyCHRON Calendar. Client side 114 may be a web page operated via a web browser. As will be described in more detail below, users may also access contents of third party content and/or Ad publishing servers 106 through SkyCHRON Calendar 112. Third party advertiser servers 106 likewise may access users of client devices 102 through SkyCHRON Calendar 112 (hereinafter, the functionalities may also be simply referred to as SkyCHRON, whereas the Calendar itself may be simply referred to as CHRON). SkyCHRON servers 102, client devices 104 and third party content and advertisement servers 106 may be coupled with each other via networks 108.

Native Enhanced Calendar Presentation Layer

Figure 2:
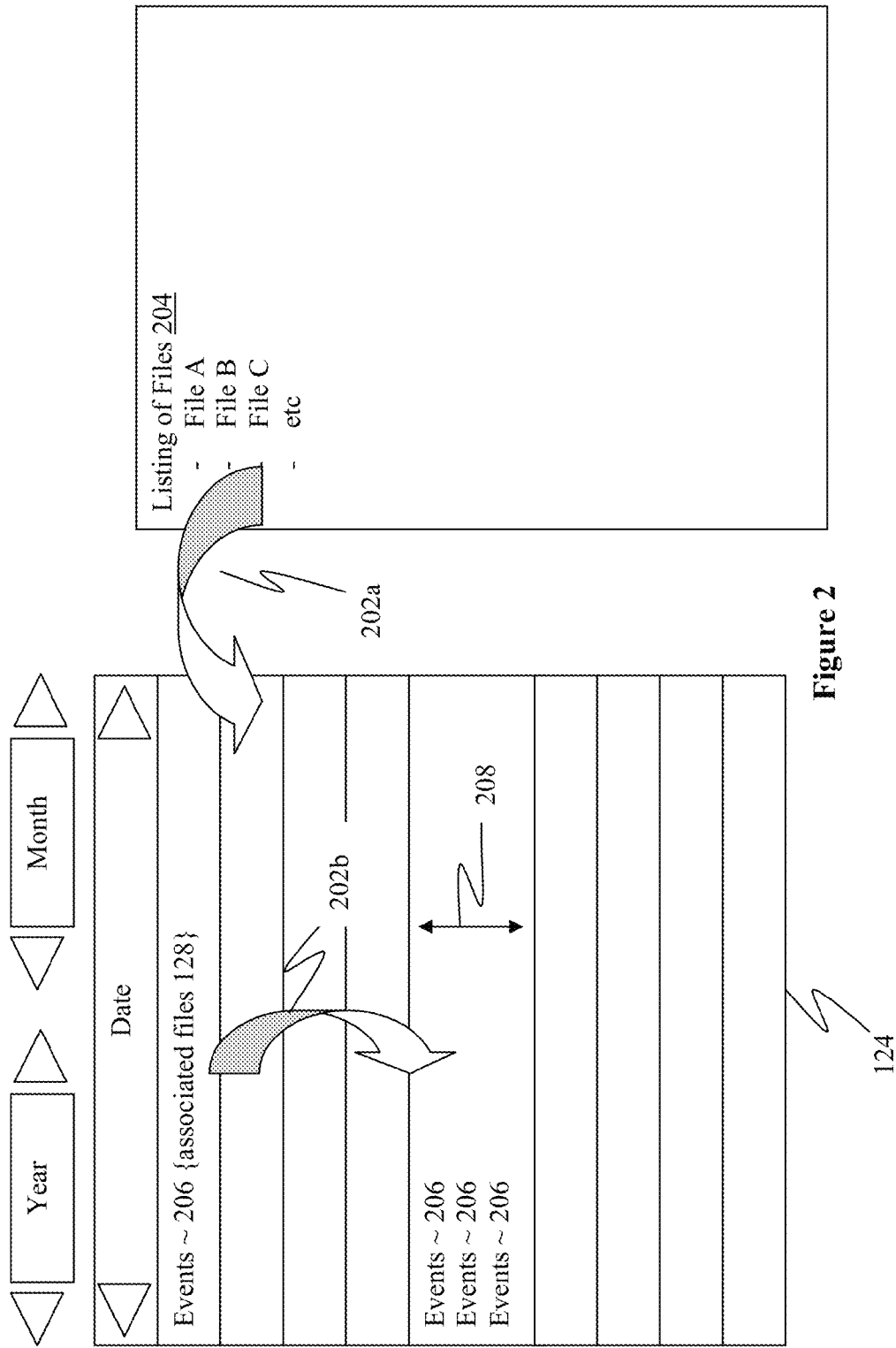
FIG. 2 illustrates drag and drop operations to associate files with scheduled events in a calendar, in accordance with various embodiments.

In various embodiments, as alluded to earlier, SkyCHRON Calendar 112 includes deep functionality 126 built into a calendar interface 124 and a chronology based file subsystem 140, allowing it to handle much more than simple appointment setting activities. New activities, as illustrated in FIG. 2, may include native support for dragging and dropping 202a files 128, e.g., from a listing of files 204 to and within a calendar 112, via interface 124, and associating them with events 206. The files may be located on any one of server(s) 102, client device(s) 104 and/or content/Ad publishing server(s) 106. Files located on client device(s) 104 and/or content/Ad publishing server(s) 106 may e.g., be made known to server(s) 102 as selections. New activities may also include, automated file naming and rich categorization. As illustrated in FIG. 1, new activities may also include pushing a series of events associated files 128*a* to a pre-defined user group, e.g. users of SkyCHRON 112 registered for a class. Further, new activities may include sophisticated search and reporting 134, rich novel UI elements in UI 124, and/or cloud based storage (through file subsystem 140). Still further, new activities may also include sharing, dynamic notation of files, novel data collection and utilization techniques, a new event series publishing model and associated business model, win-win advertising paradigm and/or revenue share model, all customized using the personal calendar information of the individual user. Instead of just storing files 128 in the old "file in folder" paradigm, in embodiments, SkyCHRON 112 may be configured as a cloud database that allows complex connections between files such that the user can manage and retrieve all their information more intuitively. Unlike a normal database, SkyCHRON 112 can still use a hierarchy of folders, but adds to it the power of a relational database, all delivered in the cloud so it is persistent and available on any of the user's devices.

In contrast, prior art products such as MS Outlook, Apple iCal and Google+ Calendars are all flat calendars. For example, if one does a drag and drop of a document into Outlook's calendar, it creates an appointment named the same as the file name. Then the user has to insert the file into that event—so conceptually events double as folders.

Method of Deep Contextual File Notation

Currently, computer systems do not allow file level notes—instead they are done at the application level like "Comments" in MS Word. In various embodiments, SkyCHRON 112 may include functionality configured to allow users to add notes 130 onto any file 128 stored. Notes 130 can create relationships between files and groups of files. In various embodiments, SkyCHRON 112 may be further configured to overlay a note 130 on any file 128 by storing the note 130 in the metadata of that file 128 or by associating a SkyCHRON specific file or a table (not shown) that is associated with the user's file 128.

Automatic Classification of Files Based on "ICI" (Individualized Chronology Information and Other Context)

In various embodiments, SkyCHRON 112 may implement a method of default file naming when a name is not already user specified, utilizing appointment or category during which the file is time stamped. Also SkyCHRON 112 may use device name from which the file was created and location data. For example, a user's phone "knows" they are on Mount Rainier, so that information can be saved in the meta data of any files created, so it can be used in default file naming and categorization.

In various embodiments, SkyCHRON 112 may be configured to utilize the timestamp and contextual data about files to determine what categories or tags to apply to the file. For example, if the file (such as a syllabus, handout and/or assignment) is saved during a class Math 101 on an individual's calendar, then the file gets a Math 101 category applied by default. In various embodiments, SkyCHRON 112 may be configured to recognize what a file is; for example, if the file is a picture, whether it is of mountains, a lake, or a particular person. Additionally, SkyCHRON 112 may auto name and categorize files based on what SKYCHRON 112 knows about the file from the timestamp, location and other metadata associated with the file. Currently, prior art applications either pick the first few words in the file, or require the user to pick what the file name should be. For example, prior art camera software typically applies a sequential naming system, and allows batch naming of files, but does not do any intelligent naming or categorization.

In various embodiments, SkyCHRON 112 may be configured to prioritize categorizing and naming by Time/Place/Category and Person, as well as other metadata associated with the file. Files may be categorized by default into the nearest category match.

In various embodiments, SkyCHRON's cloud based database may contain schedule information, device information, and location data. In various embodiments, SkyCHRON 112 may be configured to use an artificial intelligence algorithm to suggest likely file names and if the user specifies no file name SkyCHRON 112 may use a combination to make it more searchable later. Currently, prior art systems such as MS Office just take the first few words in the file.

In various embodiments, past naming and renaming of an event may be stored as metadata to all associated time stamped files. As above, in various embodiments, SkyCHRON 112 may dynamically add metadata 130 to all files associated with an event, including when the event name changes.

Current prior art calendar programs like Outlook and iCal don't suggest file names by category. As a non-limiting example: During a calendar event called Prom Night, with SkyCHRON 112, a user may send and receive many SMSs and take and share many photos 128*b*. In embodiments, on receipt, SkyCHRON 112 will group all the SMS messages and photos 128 under "Prom Night" (event, or category if available) by default.

In various embodiments, SkyCHRON 112 may be further configured to support multi-level naming menu to allow easier selection of a much larger array of file name options based on file categories, timestamp and other metadata. In various embodiments, SkyCHRON112 may be configured to employ the rich system knowledge it has about each file to suggest a larger number of default naming options. As described earlier, most prior art applications either pick the first few words in the file itself, or force the user to type something. In various embodiments, SkyCHRON 112 may further be configured to allow selection of intelligently generated naming options to be selected by voice command.

In various embodiments, SkyCHRON 112 may be further configured to dynamically create new Categories by default when no category is already specified, using date, event name, file type, device and location information. (In embodiments, this features may be user configurable, such that it can be turned on and off by the user) As earlier described, SkyCHRON 112 may use smart naming technology, based on the knowledge of schedule, device and location to assist in smart category suggestions. This may be done in such a way to create a manageable (and settable) number of categories to handle large numbers of uncategorized files. In various embodiments, SkyCHRON 112 may be configured to not create categories, if there are a small number of uncategorized files. In various embodiments, SkyCHRON 112 may be further configured to detect a need to create some groupings, and suggest based on similarities in the file's metadata, content and timing. The categories may subsequently be employed to retrieve the files associated with the categories.

For example, RSS feeds may be automatically saved into a calendar (matching to nearest event of particular category, if the RSS feed is marked as a particular category) If no category is specified for the feed, the feed may still be scanned for key words to assist in assigning a category. For example, if Hulu Idea is a category, then articles and RSS feeds containing Hulu would get a Hulu Idea category. Articles and feeds can pick up multiple categories. Chat sessions can also be captured this way.

Tagging Algorithm:

In various embodiments, SkyCHRON 112 may be configured to implement the following tagging algorithm.

1. Detect file type
2. Select a processor based on user permissions—ensure SkyCHRON 112 has permissions to access file contents.
3. Extract tags from metadata
4. Send the file data to a tagger
5. Categorize the file based on system defined categorization rules
6. Associate user defined categories (e.g., an event, a time period) to the file and/or to each independently searchable item in the file. These are temporal in nature as they are based on user's SkyCHRON 112 categorization rules. Association may include generation of the association data to associate the files with categories.

Drag and Drop Files Directly into and within a Calendar

In various embodiments, as illustrated in FIG. 2 and described earlier, SkyCHRON 112 may be configured to allow files to be dropped 202*a* into the CHRON with one simple action. The files may be categorized, by default, based on the time added and other contextual information contained in the SkyCHRON Server 102. As described earlier, the files may be located on server(s) 102, client device(s) 104, and/or server(s) 106. Once in the calendar 112, the files 128 may be dragged 202*b* around and associated with other documents and events. Examples of events may include, but are not limited to, a class, a movie, a concert, a theatrical performance, a sport event, or an occasion scheduled in the calendar of the user. Because this information is maintained through SkyCHRON 112 maintained metadata 130, files 128 can easily be moved without losing contextual information or making them difficult to find. In various embodiments, SkyCHRON 112 may also be configured to allow files 128 to be dropped into the CHRON by verbal command or touch screen gesture.

Automatic File Saving into a Calendar

In various embodiments, SkyCHRON 112 may be further configured to allow any file type be automatically saved into SkyCHRON 112 at pre-set or ad hoc intervals or as available. The default process can be telescoped to ALL, or just particular file types. For example, if the user doesn't want to save chats, emails, tweets, feeds and SMSs by default, the user may remove these from the list of automatically saved files. In various embodiments, SkyCHRON 112 may be configured to keep track of all of a user's files 128, SkyCHRON users can decide which should be archived in their CHRON by default. In various embodiments, SkyCHRON 112 may be configured to do this system wide whereas other storage systems either back up everything or back up specific locations, or keep a running database in a certain file type. SkyCHRON 112 may be configured to watch for keywords on incoming mails, RSS feeds, chats etc to assist in determining if the user would like to save this file in the CHRON or not. When user assistance is required, the CHRON makes a best guess if a file should be stored, then stores, names and categorizes the file, subject to later user review. The reviews may take place in batches, so the user is not pestered as new files arrive (unless they want to be). Each review allows the system to further hone its decision algorithms to require less and less user input as time goes on.

In various embodiments, the user may also modify settings manually, if automatic settings need improvement.

Method of Maintaining Classes of Contacts

In various embodiments, SkyCHRON 112 may be configured to allow classes of contacts. Further, SkyCHRON 112 may be configured to allow users to have control of differentiated contact trust settings. For example, a user may designate some contacts as regular contacts and others as privileged contacts with specific (settable) levels of privilege, such as ability to see into parts of the user's calendar.

Method of Calendar Sharing

In various embodiments, SkyCHRON 112 may be configured to allow users to utilize ICI to selectively share calendar information with a plurality other system users. SkyCHRON 112 may include the functionality 126 that provides a user the ability to share calendars selectively and seamlessly between trusted contacts. This may be done at several levels of granularity, from all to none, to certain categories of appointments, to simple available/not available/maybe status. Prior art calendar applications such as MS Outlook+MS Exchange allows sharing, but requires a whole MS technology stack and doesn't allow category or appointment level granularity.

For example, a user may have a professional and personal calendar. Professional may be public to her workplace by default, whereas personal may be private by default, unless specific events are marked differently than the default settings. The calendars may be mashed into one view, but edits may be made in each calendar individually to avoid privacy mistakes. On the professional calendar, the user may set in-office hours on a daily basis and allow people to schedule into open areas where she allows meetings. Others might see Busy/Available/Maybe for different time slots. The user may set the privacy settings on a per calendar, per category, and per appointment basis. In various embodiments, SkyCHRON calendars 112 may exist individually. Prior art calendar applications like Outlook or iCal provide purely shared calendar only. Further, Outlook and iCal do not have such granularity of privacy settings.

Method of Persistently Maintaining an Index of Links to all of a User's Personal Files In various embodiments, SkyCHRON 112 may be configured to store locations of files, marked by unique identifier, and update when files are moved, copied or deleted, so that once a user has a file indexed in the CHRON, it is always findable. Users can very simply upload files 128*b* into their CHRON, without needing any other technology stack. In various embodiments, SkyCHRON 112 may be configured to access or maintain a database of a user's files 128 and associated metadata 130, and updates this continuously so they are always findable. By contrast, prior art shareware app "Everything" just looks at current files 128 in one system and Windows just searches. In various embodiments, SkyCHRON 112 keeps track of the user's files so they don't get lost.

In various embodiments, SkyCHRON 112 may be configured to link all of a user's devices 104 through the CHRON database to allow all of them to publish directly to the CHRON with single click. Classifications and default naming and categorization may happen equally well from any device. In various embodiments, SkyCHRON 112 may be configured to work across all devices 104 that can use HTML or similar computing language.

All of this is delivered without the full technology stack of MS Outlook+Exchange+SharePoint, or Apple iCloud. Further, unlike iCal, the functionalities are not limited to Apple devices.

Method for Managing Legacy File Types in a Storage System

In various embodiments, SkyCHRON 112 may be configured with extended services to provide automated user generated file type compatibility monitoring. Over time, users' files 128 can become obsolete as new versions no longer support legacy file types. SkyCHRON 112 may constantly monitor all user files 128 on a system, and check compatibility when user decides to uninstall or upgrade software used to view file 128. SkyCHRON 112 may further compare all file types in the user's calendar (looking first at the oldest files) and access a database of supported vs. unsupported file types. For unsupported file types, SkyCHRON 112 may also access a set of tools to upgrade the files 128 to formats that are readable by current or about to be installed applications on user's system. This prevents users from losing access old file types as systems and apps come and go.

Method of Electronic Calendar Publishing

In various embodiments, SkyCHRON 112 may be configured to allow pushing calendar data, such as event series and associated documentations, to a subscriber list. In various embodiments, SkyCHRON 112 may be configured with a Publisher Service 132 to auto populate to a list of users from an array of ready to deploy date series. Events may be organized by category, so when a Master Publisher, such as a teaching institution, has a group of subscribers for say "Math 101", then they simply set the Master Publisher calendar 112 to "Math 101" and make their distribution and/or updates to files (such as syllabus, handouts, or assignments) associated with the class. When changes are made, the Master Publisher may push "Publish" to send file updates to all the subscribers to "Math 101." In various embodiments, the file updates go into their calendars 112 under the category "Math 101" (associated with all the scheduled Math 101 classes in the respective subscribers' calendars) In various embodiments, course materials, such as syllabus, handouts, assignments, may be attached and published this way. Prior art calendar applications like MS Outlook and MS Exchange calendar systems allow users to invite any number of participants to a meeting or series of meetings, and docs can be attached, but the series has to be regular recurrence. It can't be a fully flexible list of dates as provided by embodiments of SkyCHRON 112. In various embodiments, SkyCHRON 112 may be configured to enable publishers to auto populate the calendars 112 of a list of users. These can be provided as options or accepted appointments at the publisher or user's discretion. Then can just as easily be deleted or acceptance status changed in the same grouping, or individually. For example, the Seahawks football team may publish a game calendar. Each accepted event can trigger parking passes, ticket sales, team roster, stadium seating plan, coupons 128a for nearby sports bars and team memorabilia shops, invitation to a pre-game party etc.

Similarly, SkyCHRON 112 may be configured to accept files, such as reservations, receipts, promotions, from transportation and/or hospitality service providers, and automatically associate the files with events scheduled in the Calendar, such as scheduled trips/travels. Examples of transportation and/or hospitality service providers may include, but are not limited to, airlines, railroads, bus, rental car, ferry, and/or cruise operators, as well as hotel, resort, and/or restaurant operators, and concert, sporting event, conference and/or meeting operators. SkyCHRON 112 may store the files and associated them with scheduled events, such as scheduled vacations, trips or openings.

In embodiments, SkyCHRON 112 may be configured to accept medical care related files, such as prescriptions, test results, invoices, and so forth, from medical care providers, such as, but not limited to, doctors, clinics, hospitals, pharmacies, and/or laboratories. SkyCHRON 112 may store the files and associated them with scheduled events, such as doctor, clinic, laboratory or hospital appointments, or scheduled prescription refills. The appointments, such as pre-natal or annual check-ups may be periodic.

Prioritization of System Resources Utilizing ICI

In various embodiments, SkyCHRON 112 may be configured to store ICI for each user. The information may be used to prioritize system and network resources.

Prior art services currently allow business users to increase capacity whenever load is increased, as set up by business user. It does not use knowledge of likely user requirements. In various embodiments, SkyCHRON 112 may be configured to derive system knowledge of individual user schedules and system requirements during past events. For example, during vacation, a user may save many photos 128b with notes into their CHRON, or during particular classes, access particular network data sources and services. This predictive information can become more valuable as system and network resources become more constrained.

Prioritization of Advertising Opportunities Utilizing ICI

Figure 3:
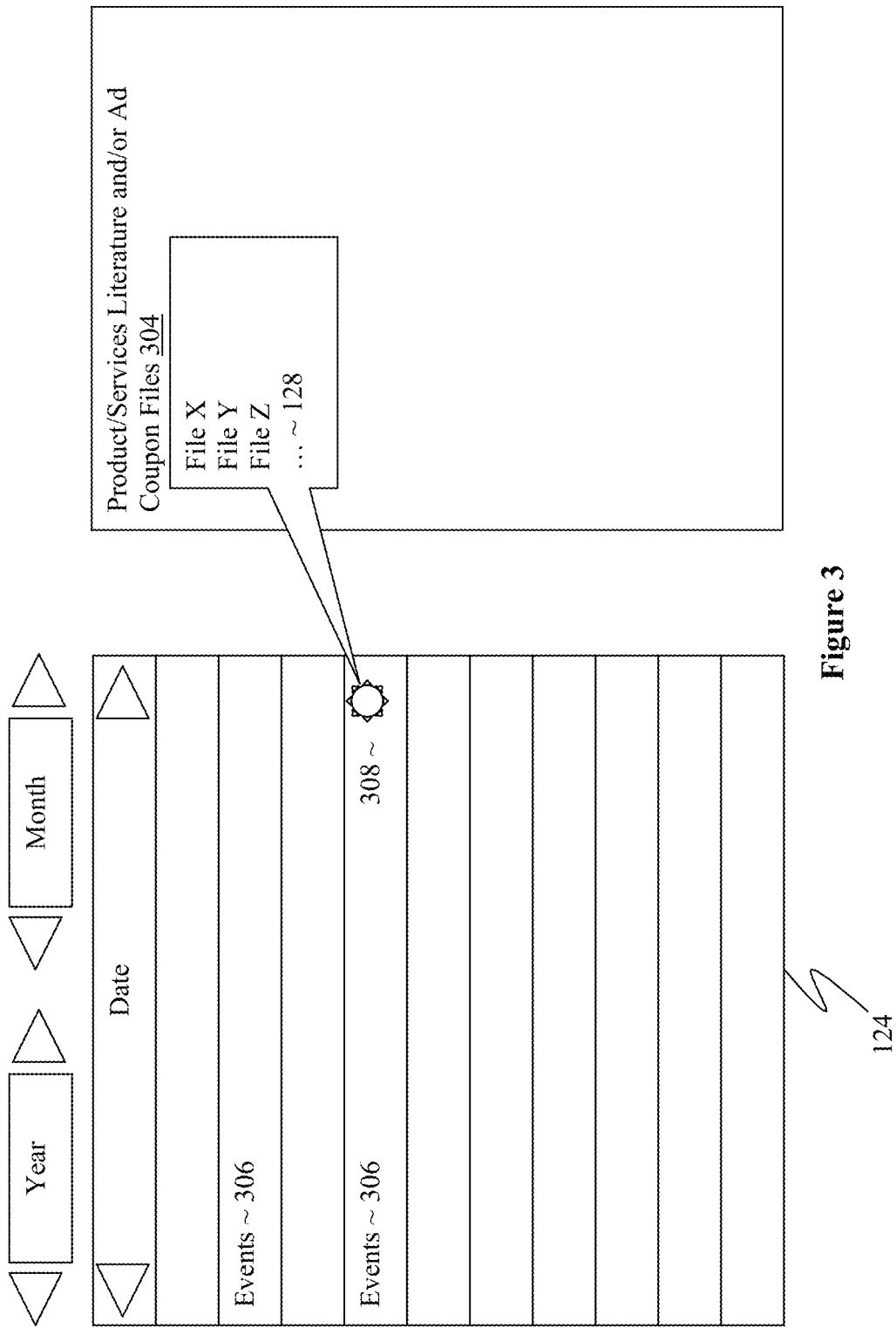
FIG. 3 illustrates offers of product and/or service literature or coupons via associations with scheduled events in a calendar, in accordance with various embodiments.

In various embodiments, SkyCHRON 112 may be configured to tie in the "when and where" with other demographic info to improve the targeting of advertisements. In various embodiments, as illustrated in FIG. 3, SkyCHRON 112 may be configured to use knowledge of the user's future location and activities (e.g., from events 306), to offer advertisers the opportunity to make offers (e.g., through files 128) that are more likely to be availed by the user.

Utilization of system knowledge of future time and location plans and even the user's pattern of past appointments and locations, can enhance prediction of likely time and location windows to accept offers from publishers. This provides a method of making an offer 308 for events 306 (say concerts or club meetings) whereby the event 306 is suggested in an individual's calendar 124 and may be accepted, ignored or explicitly rejected. Ignored offers 308 may dissolve by default once the event 306 has passed, or once the deadline to register has passed or the offer 308 is sold out or cancelled by the advertiser. The user may still retrieve expired offers 308 up to a user settable period of time, after which the offer 308 may be permanently deleted unless explicitly saved. Offers 308 which are accepted may be saved by default unless deleted by user. Further, without limitation, offers 308 may be conveyed/made using any one of a number visual and/or audio indicators.

Advertisements 128 may be auto deleted when not relevant by either time or place. The advertisements 128 may be updated dynamically, so an advertiser can update the original ad, which changes it in the user's calendar 124, rather than bothering them with a modified duplicate. In various embodiments, SkyCHRON 112 may be configured to combine data related to what a user scheduled, vs. whether their actual location (e.g., according to their mobile devices) matches where they planned to be. These past patterns can be used to infer future behavior. For example, if the tennis committee meeting always runs over time, SkyCHRON 112 may adapt to this situation intelligently, minimizing offers 308 from stores that are closed by the time the user actually leaves the meeting site. In this way, SkyCHRON's calendar advertising paradigm may create a more effective advertising pathway that also eliminates spam.

In various embodiments, SkyCHRON's calendar 124 may allow users to see "offers" 308 which can be turned into appointments by selecting them, but otherwise they just fade away once the time passes.

In various embodiments, past appointments may be archived by Category to assist future recall.

In various embodiments, SkyCHRON 112 may be configured to analyze past calendar data to help predict future demand for goods and services and all publishers to advertise intelligently in a way that is appreciated by users.

Publisher and/or Subscriber Moderated Preferential Advertising Model

In various embodiments, SkyCHRON 112 may be configured to enable a Master Publisher to influence what advertisers can preferentially reach subscribers by default. Master Publishers who have knowledge of their users (such as churches and universities) may use that knowledge to steer advertisers preferentially to their user base.

Users can also influence the advertising model (in the most common embodiment, the User trumps Master Publisher, but if user is passive, then Master Publisher has more influence). Either way, the advertisers may get a more highly segmented and targeted list of potential customers and the users get less useless spam. Prior art services/systems like Google and others show users options that they are more likely to buy, and allow some basic input, but they are unable to use specific user ICI information.

In addition, in various embodiments, Master Publishers may 'own' a specific population segment and typically have some information about their schedules and locations at certain times, not to mention population preferences.

In various embodiments, SkyCHRON 112 may be configured to support direct relationship between advertiser and subscriber, and give power to the subscriber to moderate what types of offers 308 they receive. Moderation data can be used to help advertiser to rethink targeting and improve response rates. In various embodiments, SkyCHRON 112 may be used to create a direct link between advertiser and subscriber, without requiring payment be made through SkyCHRON 112.

Scheduling thus becomes less of a bother since times are visually suggested as "offers" 308 into one's calendar 124, and offerer can select times that appear open for the offeree. Advertising is likewise less intrusive and more likely to be relevant and convenient. In various embodiments, Sky-CHRON server 102 may be configured to store the individual's information, which can be seen anonymously by Sky-CHRON's Ad Server. The advertiser (publisher) can elect to advertise directly into the calendars 124 of individuals who have open times that correspond to their own desired times to make offers such as slow periods etc.

Utilizing ICI to Enable User Requested Advisements (Pimp My Time)

In various embodiments, SkyCHRON's calendar 112 and publishing paradigms may also provide a system and method for reverse marketing or auctioning of individual time to a plurality of suppliers/vendors. The reverse auction of user time to (known and/or unknown) potential vendors may be a powerful way for users to improve the quality of choices they receive during key buying times. Users may set any scheduled event or open time as open for offers 308 and/or specify what type of offers 308 they are open to. For example, the user can say, through calendar entries 3-6, "please show me offers for beach vacations during the $3^{rd}$ and $4^{th}$ weeks of September," or "great destinations with toddlers over Memorial Day weekend in the Pacific Northwest" or "Mother's Day dinner ideas near Kirkland".

In turn, Skychron 112 may make available the "open for offer" information to transportation and/or hospitality service providers with potential interest. In response, transportation and/or hospitality services may extend offer for the scheduled events or open times of the user, through Skychron 112. In receipt, Skychron 112 may associate the received offers with the scheduled events or open times of the users. The user may then accept, reject or ignore the offers. The acceptance or rejection may be conveyed to the transportation and/or hospitality service providers directly or indirectly through Skychron 112. If accepted, the transportation and/or hospitality service providers may push the reservations, invoices, receipts, promotions, and/or agreements to the user, through Skychron 112. As described earlier, Skychron 112 may generate association data, associating the reservations and/or agreements with the scheduled events or open times. If rejected, Skychron 112 may delete the offers. If ignored, Skychron 112 may delete the offers when timeframe is no longer relevant or no longer available.

Reporting

In various embodiments, as illustrated in FIG. 1, Sky-CHRON 112 may be configured to allow chronological reports 134 to be generated according to categories or multiple categories. Items can be deselected if they should be removed from the report. SkyCHRON 112 may allow a time range to be specified, and then the user can dynamically select/deselect category filters to be applied to the range, to filter out information that they don't want included in the view. We then allow a full publish of the data, to whatever destination the user specifies (Printer, PDF, cloud storage etc.) Prior art calendar program like Outlook email may let a user sort email by time, but the user gets everything. Prior art browser Explorer does the same. Prior art calendars like iCal and Outlook let you select and deselect tags, but not specify a date range at the same time, it only works within the month or day or week view that you have.

In various embodiments, SkyCHRON 112 may also be configured to allow time based reporting using images, not just text. For example, images tagged "My Weekly Soccer Game," "My Weight", or "My 401K" can show a time series of images. One can scroll through the series, in timeline fashion.

Using ICI to Enhance Automatic Privacy Settings

In various embodiments, as illustrated in FIG. 1, Sky-CHRON 112 may be configured to use ICI to assist in suggesting privacy settings 136 for individual files. Sky-CHRON's may be configured with algorithms to determine the most likely privacy settings of each file 128. Files 128 may be private by default, but under certain conditions Sky-CHRON 112 may suggest a file 128 may be shared or made public. In various embodiments, SkyCHRON 112 may be configured to require confirmation by the user. In various embodiments, SkyCHRON 112 is configured to be inward facing to the user by default, SkyCHRON 112 is able to collect more detailed privacy related information about a user's files 128. In various embodiments, SkyCHRON 112 may be configured to use what it knows about the user's past behavior preferences and likely behavior based on other users, to suggest when a file 128 should be shared or made public. Prior art social network Facebook is outward facing and not private by default.

UI/Presentation/Dynamic Modification of UI based on ICI

In various embodiments, as illustrated in FIG. 2, Sky-CHRON 112 may be configured with UI 124 where calendar time periods with more appointments are proportionally more prominent (bigger) 208 in the SkyCHRON calendar display area. Prior art calendar programs like iCal, Google+ and MS Outlook etc. are all one size and have one range increment (month, week, day, year). In various embodiments, Sky-CHRON may be configured to support dynamic calendar views.

Figure 4:
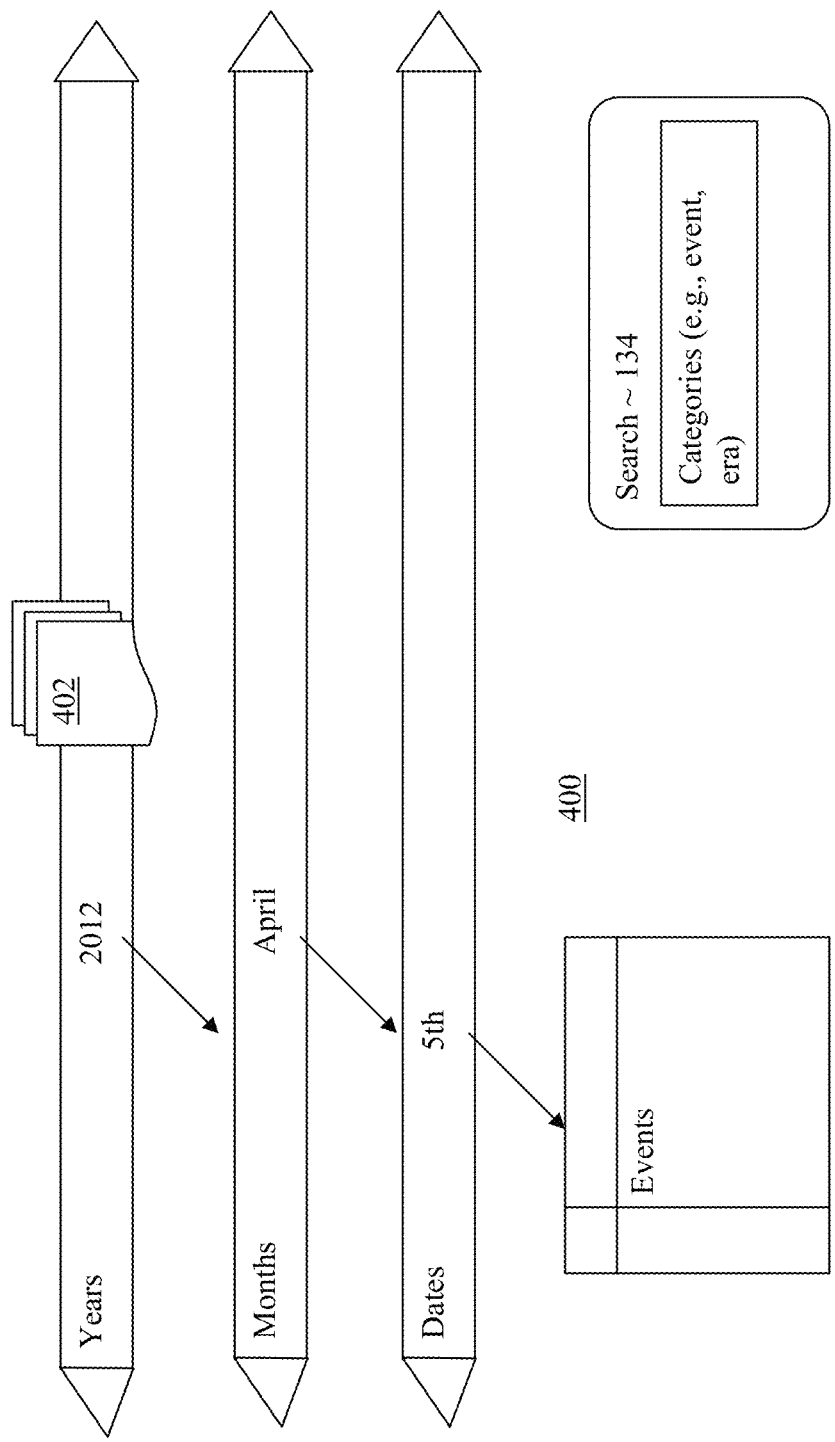
FIG. 4 illustrates a continuum view of a calendar, in accordance with various embodiments.

In various embodiments, as illustrated in FIG. 4, Sky-CHRON 112 may be configured to use a calendar UI paradigm 400 of "continuous" calendar that is "elastic," where a time continuum representation may be contracted to provide less details, or expanded to provide more details, rather than the clunky month by month or week by week approach. This makes it easy to scroll through and see depth of files and events, telescoped to provide more screen real estate for areas that have more content, zooming into an event or expanding out to a time period or era. Earlier described drag and drop operations to drag and drop files 402 into the calendar to associate the files 402 with events may be performed on a continuum of time periods. Users may provide category names, such as era designations, for the time period continuums. Era designations may include, e.g., a childhood era, a teenage era, a high school era, a college era, an era expressed in terms of residence in a country, a state, a city, or a street, or an era expressed in term of association with an organization or institution.

In various embodiments, as illustrated in FIG. 1, Sky-CHRON 112 may be configured to implement a UI 124 of displaying a calendar and items in a 3D "movie" format, similar to a 3D video game. SkyCHRON 112 may create a 3D display world view which instead of showing game characters, it shows actual files visually. Icons may be 3D and show contents of files realistically in 3D. A user can see a room full of desktops with documents on them all at one time this way. For example, each deck can be a category, and a user could visually see at a glance much material was there and representative examples on top of the piles. (In various embodiments, SkyCHRON may be configured with an algorithm for determining the most representative documents and putting them on top.) In various embodiments, SkyCHRON 112 may be configured to incorporate feedback from user directly, and from user interaction with the 3D environment to constantly put more relevant information at the top of stacks. (For example if a user is always digging out the same pictures or documents, we make those easier to find next time. SkyCHRON 112 may incorporate a method of displaying groupings of files in a collage, utilizing overlays and 3D to enhance rapid visual information assimilation. With one sweep of a user's eyes, they can take in much more information than what the current state of the art can show in more 2D traditional formats.

Further, categories and groups of categories may be shown as rooms, with timeline around the walls, similar items grouped together, to assist finding what one is looking for. A user may drill down on the category to find more and more specialized room. A user may even take a quick survey of items in a sort of "Life passes before eyes" scan of their personal CHRON, to assist big picture view of contents of any library.

In various embodiments, SkyCHRON's UI 124 may be configured to allow user to control the size and location of the portion of ad space devoted to public advertisers vs. master publisher recommended advertisers. In various embodiments, SkyCHRON 112 may be further configured to allow the user to set the amount of space devoted to public vs. master publisher recommended advertiser, via user settings. Current technologies don't even have the different class of publishers, so the functionality is presently not available in prior art calendar programs.

One Button "Now"

In various embodiments, SkyCHRON 112 may be configured to implement a UI 124 that enables a user to open up a time frame starting "NOW" saying all activity corresponds to a particular activity (and thus Category) by default. So any chats during that time, any SMSs, any photos, any web sites visited, files created or edited etc are added to that category. When the session is closed, the user may review all the files and easily check mark next to any that should be excluded (chats and SMSs that were unrelated interruptions, for example, but not lose a single thread of thought that went into the idea. Thus, under SkyCHRON 112, a CEO making an important decision, later defending his actions against a shareholder lawsuit, may be able to recall the specific conditions that led to his decisions and what informed his disclosures to the board.

In various embodiments, SkyCHRON 112 may be configured to allow saving 138 across multiple applications to capture all user files 128 during a particular time slot. A Group Save may take a snapshot at a particular point in time as well.

In various embodiments, Save function 138 of SkyCHRON 112 may be configured to implement a method of selecting from a group of files open at one time, which should be grouped together and saved under one category, such as Hulu Idea. This could include a snapshot of the website of the new Hulu based startup, some patent research, a business article and notes from a conference session and photos taken of a white board and audience tweets. In various embodiments, SkyCHRON 112 may scan for all open files when this option is selected and saves them all in their current state to a single group. Files remain open and changeable after the "snapshot" or can be all closed by default, based on user preference. Currently a user typically has to save each item from each application and put them in a folder separately.

System and Method for Intuitively Browsing Files, Categories, Events through Time In various embodiments, SkyCHRON's calendar 112 may telescope on both sides of selected time periods. The UI 124 effect may be like a magnifying glass over the selected range, with less magnified sections on both sides of the selected range. Selected range can slide easily. This feature may take total advantage of touch screen technology to move and shape the range parameters. SkyCHRON's calendar 112 may change dynamically to always show as much relevant information as possible, rather than typical straight jacketed calendar boxes. Prior art calendars like iCal, Google, and MS all have static calendar shapes for hours days months years. This UI feature also incorporates categorization by time/place/category and person in a novel way to assist in user recall.

Method of Hands Free Scheduling and Offer Selection

In various embodiments, UI 124 of SkyCHRON 112 may be configured to allows voice acceptance of offers by asking for offers during particular time, narrowing options by defining sender, type, etc. SkyCHRON 112 may link the voice recognition service to a smart suggestions of options at particular times (enabled by SkyCHRON's knowledge of user ICI), so narrowing down and acceptance can be done verbally.

Data Usage Enabled by Calendar Paradigm

In various embodiments, SkyCHRON 112 may be configured to support segmentation of population by future activity and location. SkyCHRON 112 may use stored information to segment a user population by future activity/commitments. SkyCHRON 112 may then segment the population based on schedule similarities.

Extracting Metadata from Existing Folder Structures

In various embodiments, Save 138 of SkyCHRON 112 may be configured to crawl an existing folder structure and store this structural information in file metadata so that files can retain their folder based relationships even after files are moved or reorganized.

User Discoverability of Individual Marketing Data

In various embodiments, SkyCHRON 112 may be configured to report 134 feedback targeting information to individual users, to allow them to see what data is available to publishers and advertisers. Users may manually tune their data to encourage more relevant offers.

Method of Tuning Users Preferences (Small Data)

In various embodiments, Publishing 132 of SkyCHRON 112 may be configured to provide a link with every advertisement that shows what metadata that advertiser was used to target that particular user. This sort of information is opaque in prior art systems, e.g., Google. Other's data is simply based on what the user and other users browsed and bought. They do let users see what item you bought that made them recommend something else, but users can't see that for paid advertisements.

"Small Data" is a method of collecting a user generated wish list of types of goods and services wished by a user, allowing vendors to reverse the search process and look for customers whose needs they can fulfill. Wish list includes time element and goes away when no longer relevant.

In various embodiments, SkyCHRON 112 may be configured to allow the user to manually edit their preferences for goods and service types and expose that to would be suppliers. Users who make good use of this feature can control the type of ads they receive, so they are more relevant, and therefore more likely to buy. This benefits user and advertiser. This can also apply to music suggestion services.

Revenue Share Model Enabled by SkyCHRON Publishing Paradigm

In various embodiments, Publishing 132 of SkyCHRON 112 may be configured to employ a pricing model where advertising revenue can be shared with intermediary Master Publishers and SkyCHRON 112. Users can also suggest other similar users and get a small incentive for doing so. In various embodiments, friends may turn this off if the "help" is not helping.

Accordingly, SkyCHRON 112 may be used to create a powerful connection between Ad server 106 and SkyCHRON server 102, and link individual CHRON 112 instance information with would be advertisers in an anonymous way. In various embodiments, every member may be incentivized in the chain to share information to make suggestions more relevant to the user. Everyone gets a piece of the action, and none of it is hidden. This may actually drive more success of the entire ecosystem.

SkyCHRON Easy Payment Model

In various embodiments, UI 124 of SkyCHRON 112 may be configured to enable a user to be set up such that accepting an event initiates a monetary transaction (which must be confirmed by the user). In various embodiments, SkyCHRON 112 may preload a favored Credit Card or other online payment information which can be used. It then can be selected to facilitate online transactions, or typed in each time based on user selected preference on a case by case basis. Default suggestion of the last payment method may be used based on smart melding of most similar and most recent transaction data. These payment methods may be stored by SkyCHRON 112 privately for the user only and re-used as desired by the user only. In various embodiments, SkyCHRON 112 may use intimate knowledge of the user's calendar and historical data to make smart suggestions of payment methods whenever they are ready to pay for something. Prior art applications like MS Wallet require the user to store the info with the 3rd party and do not make use of metadata to assist suggestions.

Method of Managing Storage on a Per User Basis, Including Multiple Suppliers

In various embodiments, SkyCHRON 112 may be configured to manage cloud storage on behalf of a user. SkyCHRON 112 may allow files 128 to be cued up locally, even when not online and uploaded once a connection is made. Prior art application Skype does this with messages typed to a particular person—once a user connects, the message goes up, and once the other user connect connects, they can see it.

In various embodiments, SkyCHRON 112 may be configured to load balance between suppliers to get them the best rate and take advantage of "signup" bonuses, and free periods etc on the user's behalf. All of this may be made transparent to the user.

"CHRONify" any Data Store

In various embodiments, SkyCHRON 112 may be configured to enable a user to decide to "CHRONify" any grouping of files 128 or data storage so it may be viewed and used as a SkyCHRON user instance.

Hardware/Software Components

Referring to FIG. 1, SkyCHRON server(s) 102 may be any one of a number of servers known in the art, available from, but not limited, to servers from Dell Computer of Austin Tex., Hewlett Packard of Palo Alto, Calif. Depending on the number and types of client devices 104 supported, server(s) 102 may include one or more processors of appropriate execution power, volatile and non-volatile storage of appropriate capacity, networking interface of appropriate bandwidth and type (wired and/or wireless), and so forth. Server(s) 102 may further include appropriate operating system, virtual machine monitors, database managers, and other subs-systems.

In various embodiments, SkyCHRON Calendar 112 may be implemented in instructions supported by the instruction set architecture (ISA) of the processors of the servers or in high level languages compiled into the instructions supported by the ISA. SkyCHRON Calendar 112 may be implemented in any one of a number of routines, modules, and so forth. It may be implemented in objected oriented manner. It may be implemented in a manner for multi-tasking and/or multi-thread execution.

Client device(s) 104 may be any one of a number of computing devices known in the art, including, but not limited to, desktop computers, laptop computers, tablets, smartphones, set-top boxes, game consoles, personal digital assistants, and other devices of the like. Similarly, each client device 104 may include processor, volatile and/or no-volatile storage, wired and/or wireless networking interface, operating system, and other subsystem software (e.g., Java, XML and so forth).

Network(s) 108 may include one or more public and/or private networks, e.g., the Internet. Network(s) 108 may be wired and/or wireless. Wired networks may include personal, local and/or wide-area. Wireless networks may include Wi-Fi, Wi-Max, CDMA, EDGE, 3G, 4G and beyond wireless networks.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

Other Usage of Described Features

While the above description has disclosed concepts including (but not limited to) Method of Tuning Users Preferences (Small Data), Multiple Suppliers Revenue Share Model, User Discoverability of Individual Marketing Data, Automatic Classification of Files, Classes of Contacts, Method of Deep Contextual File Notation, Method of Persistently Maintaining an Index of Links to All of a User's Personal Files, Method for Managing Legacy File Types in a Storage System, One Button "Now", Method of Managing Storage on a Per User Basis, including Multiple Suppliers, Extracting Metadata from Existing Folder Structures and others in the context as integrated deep function of a calendar application, the disclosure is not so limited. All of these concepts may be practiced in other contexts.

For example Method of Tuning Users Preferences (Small Data) can also be a stand-alone application or integrated into any other application or system where advertising is permitted. No prior art both automatically collects user data and allows users to manually help the advertisers target them more effectively. Zune and Pandora guess what else the user might like based on past behavior, but don't allow the user to help.

Multiple Suppliers Revenue Share Model could be applied to any online advertising model where there are multiple participants in the value chain.

User Discoverability of Individual Marketing Data could be implemented with any online advertising system.

Automatic Classification of Files could also apply to files not related to calendar system.

As another example, Classes of Contacts is not practiced in LinkedIn and Facebook.

Method of Deep Contextual File Notation is not practiced in any prior art file management or file indexing system.

Method of Persistently Maintaining an Index of Links to All of a User's Personal Files does not require calendar integration and could be implemented as a stand-alone system or integrated into another file presentation interface.

Method for Managing Legacy File Types in a Storage System can also be implemented as an independent service on a user's system, or as a Web Service.

One Button "Now" functionality could be accomplished without saving into a calendar.

Method of Managing Storage on a Per User Basis, including Multiple Suppliers is a back end technology that does not require a calendar system to be useful.

Extracting Metadata from Existing Folder Structures can be accomplished in a stand-alone manner, or the functionality integrated into any application.

The above examples are indicative, and not meant to be exhaustive or limiting.

Example Embodiments of Described Features

Example embodiments of described features may include, but are not limited to, an example method that includes receiving, by a computing device, a selection of a plurality of files or the plurality of files, and generating, by the computing device, association data, to selectively associate the plurality of files with a plurality of events scheduled in a calendar of a user or time periods of the user. The method may further include storing, by the computing device, the association data to facilitate subsequent selectively retrieving of the plurality of files in response to retrieval requests for files associated with selected ones of the plurality of events scheduled in the calendar of the user or the time periods of the user.

Example embodiments of described features may further include, but are not limited to, an example one or more storage medium that includes instructions that are configured, in response to execution by an apparatus, to cause the apparatus to receive a selection of a plurality of files or the plurality of files; and generate association data to selectively associate the plurality of files with a plurality of events scheduled in a calendar of a user or time periods of the user. The instructions may be configured to further cause the apparatus to store the association data to facilitate subsequent selectively retrieval of the plurality of files in response to retrieval requests for files associated with selected ones of the plurality of events scheduled in the calendar of the user or the time periods of the user.

Example embodiments of described features may further include, but are not limited to, an example apparatus, comprising one or more processors; a chronology based file subsystem configured to be operated by the one or more processors to receive a selection of a plurality of files or the plurality of files; and generate association data to selectively associate the plurality of files with a plurality of events scheduled in a calendar of a user or time periods of the user. The chronology based file subsystem may be further configured to store the association data to facilitate subsequent selectively retrieval of the plurality of files in response to retrieval requests for files associated with selected ones of the plurality of events scheduled in the calendar of the user or the time periods of the user.

What is claimed is:

1. A computer implemented method comprising:
receiving, by a computing device, from a user of the computing device, a selection of a plurality of files or the plurality of files;
receiving, by the computing device, from the user, through a calendar interface, a selection of an era of the user, wherein the era is a selected one of a childhood era, a teenage era, a high school era, a college era, an era expressed in term of residence in a country, a state, a city, or a street or an era expressed in term of association with an organization or institution;
generating, by the computing device, association data, in response to occurrence of both receiving, to selectively associate the plurality of files with the selected era of the user; and
storing, by the computing device, the association data to facilitate subsequent selective retrieval of the plurality of files in response to retrieval requests for files associated with the era of the user.

2. The method of claim 1,
wherein receiving a selection of a plurality of files or the plurality of files comprises receiving, from the user, a selection of photos taken, sound or video recordings made, or emails or text messages sent or received by the user, during the era of the user; and
wherein generating comprises generating association data associating the photos, the sound or video recordings or the emails or text messages with the elected era of the user.

3. The method of claim 1, further comprising selectively retrieving, or causing to be retrieved, by the computing devices, selected ones of the files, in response to retrieval requests for files associated with the time period of the user.

4. The method of claim 1, wherein receiving a selection of an era of the user comprises receiving, by the computing device, from the user, through a calendar interface, a time period having an era designation from the user.

5. The method of claim 4, wherein the era designation comprises a childhood era designation, a teenage era designation, a high school era designation, a college era designation, an era designation having a time period, an era designation having a country, a state, a city, a street or an organization name.

6. The method of claim 1, wherein the files comprise photos taken, sound or video recordings made, emails, or text messages sent or received, by the user, during the time period of the user.

7. The method of claim 1, wherein the files comprise files or webpages viewed or edited by the user during the time period of the user.

8. The method of claim 1, wherein the calendar interface comprises an elastic linear time continuum representation for the user to zoom into a time period of the user that spans a plurality of decades.

9. At least one non-transitory computer-readable storage medium comprising instructions that, in response to execution of the instructions by an apparatus, cause the apparatus to operate a calendar application for a user of the apparatus, to:
receive, from a user of the computing device, a selection of a plurality of files or the plurality of files;
receive, from the user, through a calendar interface, a selection of an era of the user, wherein the era is a selected one of a childhood era, a teenage era, a high school era, a college era, an era expressed in term of residence in a country, a state, a city, or a street or an era expressed in term of association with an organization or institution;
generate association data in response to occurrence of both receiving, to selectively associate the plurality of files with the selected era of the user; and
store the association data to facilitate subsequent selective retrieval of the plurality of files in response to retrieval requests for files associated with the era of the user.

10. The at least one non-transitory computer-readable storage medium of claim 9, the apparatus is further caused to:
second receive, from a remote server associated with a teaching institution or a product or service provider, a second selection of a plurality of files or the plurality of files, wherein a service provider is a selected one of a medical care provider, a transportation service provider or a hospitality service provider;
second generate association data, in response to the receive, to selectively associate the second plurality of files with one or more events previously scheduled in a calendar of a user of the apparatus by the user; and
second store the association data to facilitate subsequent selective retrieval of the second plurality of files in response to retrieval requests for files associated with the one or more events scheduled in the calendar of the user by the user.

11. The storage medium of claim 10,
wherein second receive a selection of a second plurality of files or the second plurality of files comprises receive, from a teaching institution, a selection of handouts reading materials, or assignments associated with a class having multiple class sessions spanning at least a plurality of weeks previously scheduled in the calendar of the user by the users; and
wherein second generate comprises generate association data associating the handouts, reading materials, or assignments with the class sessions previously scheduled in the calendar of the user by the user to facilitate subsequent selectively retrieving of the second received files in response to retrieval requests for files associated with the class session previously scheduled in the calendar of the user by the user independent.

12. The storage medium of claim 10,
wherein second receive a selection of a second plurality of files of a user or the second plurality of files comprises receive, from a product or service provider, product or service literature or coupons; and
wherein second generate comprises generate association data associating the product or service literature or coupons with the one or more events previously scheduled in the calendar of the user by the user, based at least in part on location information associated with the one or more events previously scheduled in the calendar of the user by the user, to facilitate subsequent selectively retrieving of the second received files in response to retrieval requests for files associated with selected one of the one or more events previously scheduled in the calendar of the user by the user.

13. The at least one non-transitory computer-readable storage medium of claim 10, wherein second receive comprises receive the second plurality of files, and the apparatus is further caused to automatically name one or more of the second received files, based at least in part on respective contexts or metadata of the second received files.

14. The at least one non-transitory computer-readable storage medium of claim 10, wherein events previously scheduled in a calendar of the user comprise an appointment, a class, a movie, a concert, a theatrical performance, a sport event, a trip, or an occasion previously scheduled in the calendar of the user by the user.

15. The at least one non-transitory computer-readable storage medium of claim 10, wherein second store comprises respectively store the association data in metadata of the second received files, wherein selective retrieval comprises access of the metadata to examine the association data.

16. The at least one non-transitory computer-readable storage medium of claim 10, wherein second store comprises respectively store the association data in a database, wherein selective retrieval comprises access of the database to examine the association data.

17. The at least one non-transitory computer-readable storage medium of claim 10, wherein the instructions, in response to execution by the apparatus, further cause the apparatus to selectively retrieve the second received files, in response to a request to retrieve files associated with the one or more events previously scheduled in the calendar of the user by the user.

18. The at least one non-transitory computer-readable storage medium of claim 17, wherein the second received files comprises text files or graphics files of a class having a plurality of class sessions spanning a plurality of weeks previously scheduled in the calendar of the user by the user.

19. The at least one non-transitory computer-readable storage medium of claim 18, wherein the instructions, in response to execution by the apparatus, further cause the apparatus to receive the text or graphics files, from the teaching institution, in response to a retrieval request for files associated with one of the class sessions previously scheduled in the calendar of the user by the user.

20. The at least one storage medium of claim 17, wherein the second received files comprises coupons of products or services from providers with location or timing information respectively related to locations or timing associated with the one or more events previously scheduled in the calendar of the user by the user.

21. The at least one storage medium of claim 20, wherein the instructions, in response to execution by the apparatus, further cause the apparatus to indicate to the user when an event previously scheduled in the calendar of the user by the user, has associated coupons provided by a product or service provider.

22. The at least one storage medium of claim 20, wherein the instructions, in response to execution by the apparatus, further cause the apparatus to receive the coupons from the product or service providers, and retrieve or cause to be retrieved the files, in response to a retrieval request for files associated with the one or more events previously scheduled in the calendar of the user by the user.

23. The at least one non-transitory computer-readable storage medium of claim 10, wherein
the product or service provider is a medical care provider;
the one or more events comprises a health care related event previously scheduled in the calendar of the user by the user; and
the second received files are health care related materials.

24. The at least one non-transitory computer-readable storage medium of claim 10, wherein the product or service provider is a transportation or hospitality service provider, the one or more events comprises a vacation or trip previously scheduled in the calendar of the user by the user, with associated invitation extended by the user for hospitality service offers, and the second received files are transportation or hospitality service offer related materials.

25. The at least one non-transitory computer-readable storage medium of claim 24, wherein the instructions, in response to execution by the apparatus, further cause the apparatus to receive an input from the user, through a calendar interface, to designate invitation for hospitality service offers for the vacation or trip scheduled in the calendar of the user by the user.

26. An apparatus, comprising:
one or more processors;
a chronology based file subsystem to be operated by the one or more processors to:
receive, from a user of the apparatus, a selection of a plurality of files or the plurality of files;
receive, from the user, through a calendar interface of a calendar application, a selection of an era of the user, wherein the era is a selected one of a childhood era, a teenage era, a high school era, a college era, an era expressed in term of residence in a country, a state, a city, or a street or an era expressed in term of association with an organization or institution;
generate association data in response to occurrence of both receiving, to selectively associate the plurality of files with the selected era of the user; and
store the association data to facilitate subsequent selective retrieval of the plurality of files in response to retrieval requests for files associated with the era of the user.

27. The apparatus of claim 26, wherein the chronology based file subsystem to be further operated to:
receive, from a plurality of product or service providers, a selection of a second plurality of files or the second plurality of files, wherein a service provider is a selected one of a medical care provider, a transportation service provider or a hospitality service provider;
generate association data, in response to the receive, to selectively associate the second plurality of files with a plurality of events previously scheduled in a calendar of a user by the user; and
store the association data generated for the second plurality of files to facilitate subsequent selectively retrieval of the second plurality of files in response to retrieval requests for files associated with selected ones of the plurality of events previously scheduled in the calendar of the user by the user.

28. The apparatus of claim 27, further comprising:
the calendar application, to be operated by the one or more processors to provide calendaring service to the user to maintain the calendar, including scheduling of events for the user, and accessing the events, including accessing files associated with the events by the chronology based file subsystem; and
a networking interface to couple the apparatus to a network, to offer the chronology based file subsystem and the calendar, as a service in a computing cloud.

* * * * *